United States Patent [19]
Mishima

[11] 3,737,693
[45] June 5, 1973

[54] OUTER-ROTOR TYPE D.C. MOTORS
[75] Inventor: Matsuo Mishima, Tokyo, Japan
[73] Assignee: Olympus Optical Co., Ltd., Tokyo, Japan
[22] Filed: Dec. 28, 1971
[21] Appl. No.: 213,077

[30] Foreign Application Priority Data
Dec. 30, 1970 Japan ..................45/122347
Dec. 30, 1970 Japan ..................45/122348
Dec. 30, 1970 Japan ..................45/122349

[52] U.S. Cl. ..................310/67, 310/51, 310/266
[51] Int. Cl. ..................................H02k 7/00
[58] Field of Search..................310/266, 67, 51, 310/154, 218, 235, 236, 237, 254

[56] References Cited
UNITED STATES PATENTS

| | | | |
|---|---|---|---|
| 3,467,847 | 9/1969 | Faulhaber | 310/266 |
| 2,952,788 | 9/1960 | Volkerling | 310/266 |
| 2,048,421 | 7/1936 | Ballentine | 310/67 |
| 3,508,091 | 4/1970 | Kavanaugh | 310/67 |
| 3,505,547 | 4/1970 | Kaneko | 310/67 |
| 3,458,740 | 7/1969 | Kaneko | 310/67 |
| 3,514,654 | 5/1970 | Moresi | 310/67 |
| 3,191,081 | 6/1965 | Faulhaber | 310/67 |

*Primary Examiner*—R. Skudy
*Attorney*—Solon B. Kemon, Carroll Palmer and William T. Estabrook

[57] ABSTRACT

An outer-rotor type D.C. motor wherein the rotor comprises a cylindrical yoke, a plurality of magnetic poles which are each magnetically coupled at one end with the inner wall of the yoke and provided at the other end with a pole piece and a bridge magnetically coupling said pole piece with the adjacent one; and armature coils wound about bobbins detachably fitted to said magnetic poles.

8 Claims, 15 Drawing Figures

PATENTED JUL 5 1973

OUTER-ROTOR TYPE D.C. MOTORS

This invention relates to an improved compact outer-rotor type D.C. motor.

The conventional outer-rotor type D.C. motor has a stator consisting of a columnar magnet inserted into the outer rotor, and a plurality of magnetic poles provided on the inner wall of the outer roller so as to project convergently toward the stator, thereby causing the rotor to rotate by a magnetic force generated across the stator poles and magnetic poles. These magnetic poles of the rotor exerting said magnetic force by its rotation are switched over in turn. At the moment, however, when the main magnetic flux of the stator pole is shifted from one magnetic pole to another, there occur fluctuations in the ganerated torque by a magnetic flux running across the stator pole and magnetic pole, leading to pulsation in the rotation of the rotor commonly known as the cogging phenomenon. Where the rotor has a lange mass, said pulsation does not exert a very prominent effect due to its great inertia of rotation. In the case of a compact low speed motor of small mass, however, said pulsation grows so large as to obstruct its smooth rotation. Particularly where there is manufactured a tape feeding device for a tape recorder or a film feeding mechanism for a small size camera using a compact motor, there has been demanded high accuracy and stability for the low speed rotation of said motor.

It is accordingly the object of this invention to provide an inexpensive outer-rotor type D.C. motor of sinple construction which can make a smooth low speed rotation with high accuracy and little inertia of rotation.

According to this invention, there is provided an outerrotor type D.C. motor comprising a stator consisting of a columnar magnet having a bearing introduced through the central axis; a shaft inserted through said bearing; a rotor including a bottom plate to the center of which there is fixed one end of said shaft, a cylindrical yoke closed at one end with said bottom plate, a plurality of magnetic poles each magnetically coupled at one end with the inner wall of said yoke and provided at the other end with pole pieces, each magnetic pole having a substantially uniform width and thickness troughout its length, a plurality of bridges stretched across the adjacent ones of said magentic poles and armature coils wound about the individual magnetic poles; and a commutator fitted to the aforesaid shaft so as to be connected to said armature coils.

This invention can be more fully understood from the following description taken in conjunction with the accompanying drawings, in which.

Figure 1:
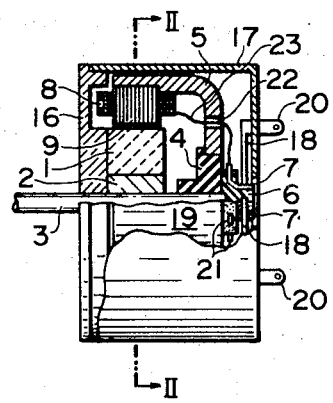
FIG. 1 is a side view, partly in section, of an outer-rotor type D.C. motor according to an embodiment of this invention.
Figure 2:
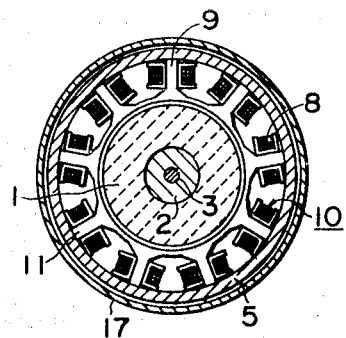
FIG. 2 is a sectional view on line II—II of FIG. 1.
Figure 3:
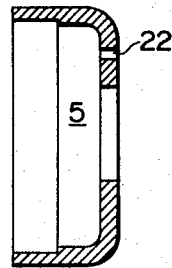
FIG. 3 is a sectional view of the yoke of said embodiment.
Figure 4:
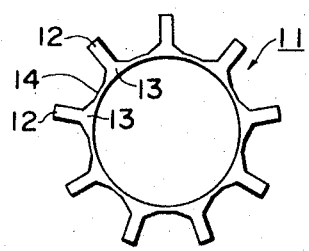
FIG. 4 is a plane view of the magnetic pole portions of said embodiment.
Figure 5:
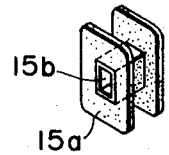
FIG. 5 is a perspective view of a bobbin about which there is wound an armature coil.

Referring to FIGS. 1 and 2, numeral 1 represents a columnar magnet consisting of ferromagnetic material such as ferrite, through the control axis of which there is introduced a bearing 2. Into said bearing 2 is inserted a shaft 3, to one end of which is fixed an insulation disk 4. This disk 4 is fitted with a blind cylindrical yoke 5 of low magnetic material having a small coercive force shaped as shown in FIG. 3. At the extension of the shaft 3 outside of the insulation disk 4 is formed a projection 6 of insulating material. In said projection 6 are embedded a plurality of, for example, nine commutator bars 7. At that part of the inner wall of the open end of the yoke 5 which faces the stator 1 is disposed a magnetic unit 10 having nine magnetic poles 9 and consisting of laminated thin elements 11 of low magnetic material having a small coercive force at a predetermined space from the stator 1. Each pole of said nine-poled magnetic unit 10 is wound with an armature coil 8 having a preserved number of turns. This yoke 5 and nine-poled magnetic unit 10 jointly constitute a rotor. Each of said laminated thin magnetic pole elements 11 consists, as shown in FIG. 4, of an integral formation of a magnetic pole portion 12 having a substantially uniform width and thickness throughout its length; a pole piece portion 13 fixed to one end of said magnetic pole portion 12; and a magnetic bridge portion 14 magnetically connecting said pole piece portion 13 with the adjacent one. Therefore, said thin magnetic pole elements 11 can be easily manufactured, for example, by press technique in the same form. The armature coil 8 is wound in advance about a bobbin 15b with a flange 15a illustrated in FIG. 5 which is made of, for example, heat resistant nonconducting resin, said bobbin 15b being detachably fitted to the magnetic pole 9. The armature coil 8 can be easily fitted to the magnetic pole 9 by inserting it forcefully through the bobbin 15b when there are luminated a plurality of thin magnetic pole elements 11 to constitute the magnetic pole unit 10. Referring to FIG. 1, the stator 1 is secured to a stator holder 16, to the periphery of which there is fitted a rotor cover 17. To this rotor cover 17 are attached a pair of brushes 18 so as to contact one end of the connutator bars 7. Thus is formed the outer-rotor type D.C. motor 19 of this embodiment of the invention. The brushes 18 are connected to a pair of lead terminals 20. The risers 21 integrally formed at the other end of the commutator bars 7 are connected to the lead wires 23 of the armature coils 8 drawn out through holes 22 bored in the yoke 5.

Figure 6:
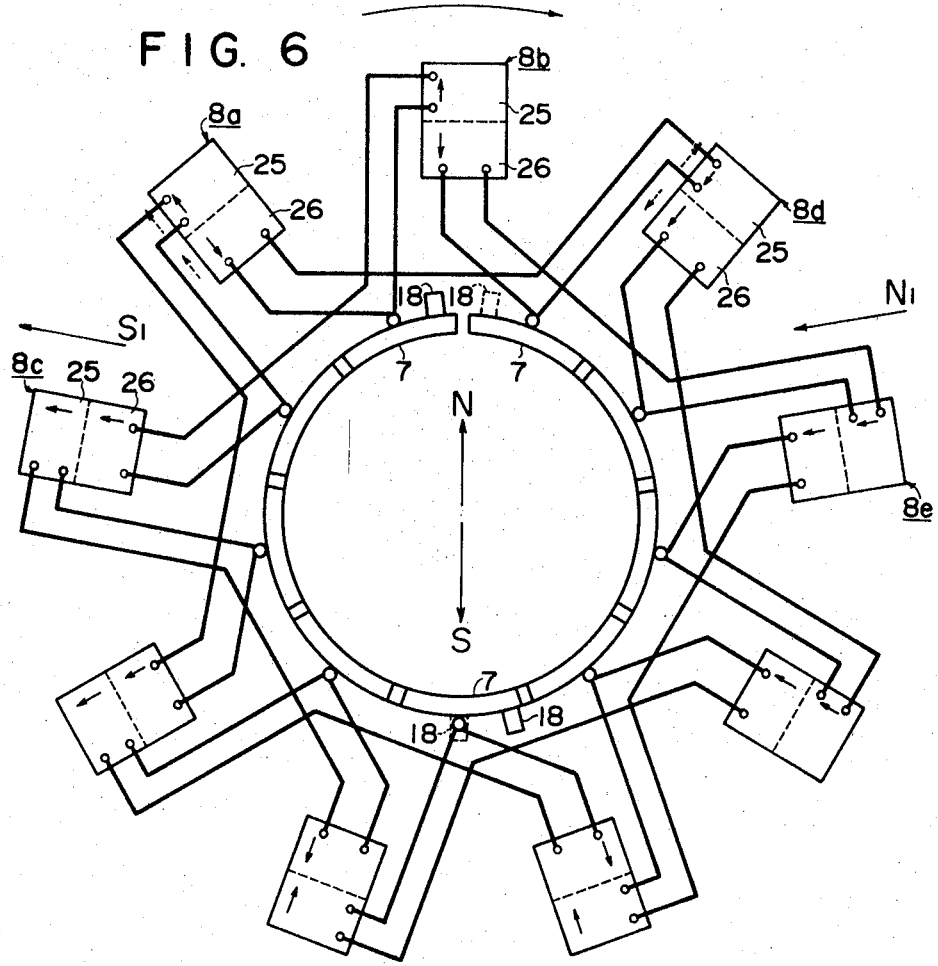
FIG. 6 illustrates the manner in which there are interconnected the armature coils according to said embodiment.

There will now be described by reference to FIG. 6 the arrangement and inter connection of the armature coils 8 and commutator bars 7 of the foregoing embodiment. Nine armature coils 8 are each formed of first and second coil sections 25 and 26. The first and second coil sections 25 and 26 of the alternate armature coils 8 are connected in series between two adjacent commutator bars 7. Now let it be assumed that in FIG. 6, the paired brushes 18 are in the position of solid lines with respect to the commutator bars 7, and the stator poles N and S are in the direction of the indicated arrows. Then the individual magnetic fields created by the D.C. current introduced through the respective first and second coil sections 25 and 26 act in the direction of the solid line arrows. Namely, the magnetic fields of, for example, two armature coils 8a and 8b are reduced to zero, whereas in armature coils 8c and 8d there occur magnetic fields $S_1$ and $N_1$ acting in opposite directions. Eventually, the rotor is made to rotate clockwise. This clockwise rotation of the rotor shifts the paired brushes 18 to the position of dotted lines with respect to the commutator bars 7. As the result, the individual magnetic fields generated by the current running through the first and second coil sections 25 and 26 of the armature coils 8a and 8b act in the direction of dotted lines indicated outside of these coil sections 25 and 26. Thus the armature coils 8b and 8d have no magnetic fields, whereas in the armature coils 8a and 8e, there arise magnetic fields $S_1$ and $N_1$ acting in opposite directions with the resultant similar clockwise rotation of the rotor. In this case, while the paired brushes 18 are shifted from the position of solid lines to that of dohted lines, the magnetic fields produced in the armature coils 8 vary in intensity from moment to moment. According to this invention, however, the adjacent pole pieces are spanned by the megnetic bridges 14 for magnetic coupling, preventing the so-called cogging phenomenon from taking plece due to magnetic bend between the stator 1 and roter. Therefore, the rotor can rotate smoothly even at as slow a speed as, for example, 200 rpm. In this case, the magnetic bridges 14 may be fabricated in proper size with mechanical strength and other factor taken into account, insofar as the rotor can be allowed to make a smooth rotation.

Figure 7:
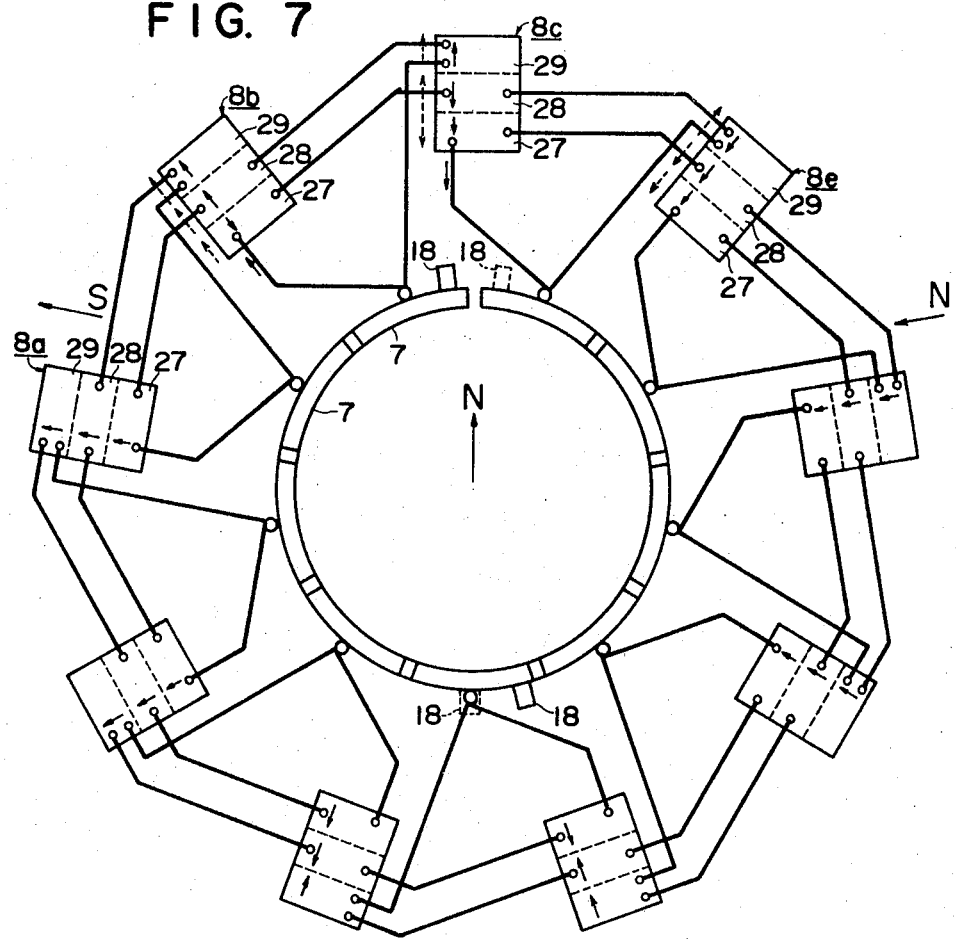
FIG. 7 shows the interconnection between said armature coils according to another embodiment.
Figure 8:
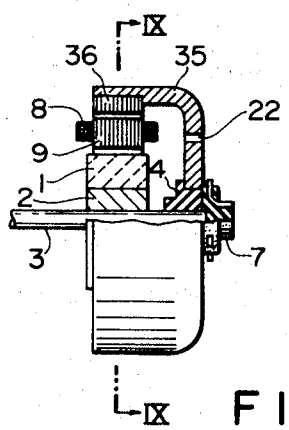
FIG. 8 is a side view, partly in section of a modification of the first mentioned embodiment.
Figure 9:
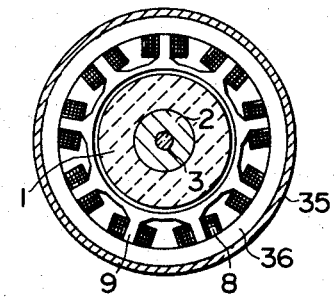
FIG. 9 is a sectional view on line IX—IX of FIG. 8.
Figure 10:
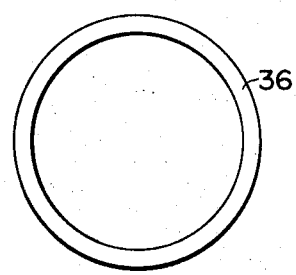
FIG. 10 is a side view of a modification of the aforesaid yoke.

FIG. 7 illustrates interconnection between the commutator bars 7 and three coil sections 27, 28 and 29, of which the arimature coils 8 of the aforementioned embodiment are how formed. For example, the first coil section 27 of the first armature coil 8a is connected in series to the second coil section 28 of the second armature coil 8b and further similarly in series to the third coil section 29 of the third armature coil 8c. Thus these coil sections 27, 28 and 29 as a whole are connected in series between two adjacent connutator bars 7. Where, in FIG. 7, the paired brushed 18 are in the position of solid lines, there is generated a magnetic field acting in the direction of the solid line arrow in the respective armature coils 8 with the resultant clockwise rotation of the rotor. Where the brushes 18 are in the position of dotted lines, there arises a magnetic field acting in the direction of the dotted line arrow, causing the rotor to rotate similarly clockwise.

Figure 11:
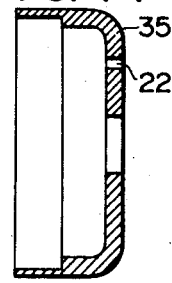
FIG. 11 is a sectional view of the suppert of said modified yoke.
Figure 12:
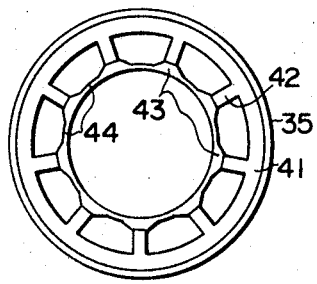
FIG. 12 is a sectional view of an outer rotor and stator according to a further embodiment of the invention.
Figure 13:
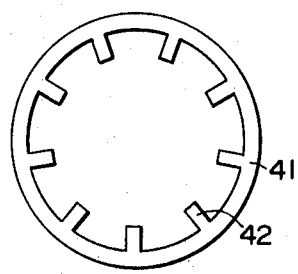
FIG. 13 is a side view of the yoke of FIG. 12 constructed integrally with the magnetic pole portions.
Figure 14:
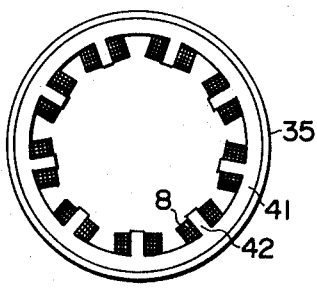
FIG. 14 is a sectional view of the megnetic pole portions of FIG. 13 wound with armatune coils.
Figure 15:
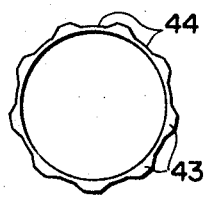
FIG. 15 is a plan view of the pole pieces of FIG. 12 constructed integrally with the magnetic bridges.

FIGS. 8 to 11 jointly show an improvement from the yoke 5 of the above-mentioned embodiment. For briefness of description, the stator holder 16 and rotor cover 17 are omitted. The other parts of the subject moter than the yoke 5 one of the same arrangement as those of the preceding embodiment and designated by the same number, description thereof being omitted. The blind cylindrical yoke support 35 of FIG. 11 is made of, for example, plastics material and fitted to the insulation disk 4. To the inner wall of the open end of said yoke support 35 is attached an annular yoke body of magnetic material illustrated in FIG. 10. The inner wall of the yoke 36 is contacted by one end of the magnetic poles 9 for magnetic coupling. While, in the modification of FIGS. 8 to 11, the yoke support 35 is formed of plastics material, it may be made of light metal (non-magnetic). Such light metal makes the yoke support 35 easily workable and reduces the weight of the rotor as a whole, thus providing a motor having a smaller rotation inertia and in consequence good controllability.

FIGS. 12 to 15 jointly represent a yoke assembly according to another embodiment of this invention. To the inner wall of the open end of the yoke support 35 made of plastics material as in FIG. 11 there is fixed an integral formation of a yoke body 41 and magnetic pole portion 42. To the free ends of said magnetic pole portions 42 is fitted an integral assembly pole piece portions 43 and magnetic bridge portions 44 for magnetic coupling between the pole portions 42 and pole piece portions 43. In the embodiment of FIGS. 12 to 15, each magnetic pole portion 42 has a substantially uniform width and thickness throughout its length, facilitating its insertion into the armature coil 45.

All the foregoing embodiment refer to the case where the core of the outer rotor was prepared by laminating a plurality of punched soft iron material, however, it is, of course, possible to manufacture the magnetic pole unit of FIG. 4 by cutting a single solid piece of material.

What is claimed is:

1. An outer-rotor type D.C. motor comprising a stator consisting of a columnar magnet having a bearing introduced through its central axis; a shaft inserted into said bearing; a rotor including a bottom plate, to the center of which there is fixed one end of said shaft, a cylindrical yoke, the open end of which is closed by said bottom plate, a plurality of magnetic poles magnetically coupled at one end with the inner wall of said yoke and provided at the other end with a pole piece, each of said poles having a substantially uniform width and thickness throughout its length, a plurality of magnetic bridges spanned across said other end of the adjacent magnetic poles to prevent occurrence of the cogging phenomenon due to magnetic bend between said stator and magnetic poles and separate armature coils wound about bobbins removably mounted on the individual magnetic poles; and a commutator mounted on said shaft so as to be connected to said armature coils.

2. The motor according to claim 1 wherein the rotor consists of an integral body of said magnetic poles; pole pieces and magnetic bridges are fixed to the inner wall of said yoke.

3. The motor according to claim 2 wherein the magnetic pole unit is prepared from laminated thin magnetic elements, each of which consists of an integral formation of magnetic pole portions, pole piece portions and magnetic bridge portions.

4. The motor according to claim 2 wherein the yoke consists of a blind cylindrical support made of insulating material and an annular yoke body fixed to the inner wall of the open end of said support.

5. The motor according to claim 1 wherein the yoke and magnetic poles of the rotor are formed in integral body and the pole pieces and magnetic bridges of said rotor are also formed in integral body.

6. The motor according to claim 1 wherein the rotor has nine magnetic poles; each armature coil consists of first and second coil sections; and the first and second coil sections of the alternate armature coils are connected in series to two adjacent commutator bars of the commutator.

7. The motor according to claim 1 wherein the rotor has nine magnetic poles; each armature coil has first, second and third coil sections; the first coil section of the first armature coil, the second coil section of the second armature coil and the third coil section of the third armature coil are connected in series to two adjacent commutator bars of the commutator, said armature coils being all disposed parallel with the rotating direction of the rotor.

8. The motor according to claim 1 wherein the armature coils are wound about the bobbins removably mounted on the magnetic poles.

* * * * *